US00RE42000E

(19) United States
(12) Reissued Patent
Yang et al.

(10) Patent Number: US RE42,000 E
(45) Date of Reissued Patent: Dec. 14, 2010

(54) SYSTEM FOR SYNCHRONIZATION BETWEEN MOVING PICTURE AND A TEXT-TO-SPEECH CONVERTER

(75) Inventors: Jae Woo Yang, Daejon-Shi (KR); Jung Chul Lee, Daejon-Shi (KR); Min Soo Hahn, Daejon-Shi (KR); Hang Seop Lee, Seoul (KR); Youngjik Lee, Daejon-Shi (KR)

(73) Assignee: Electronics and Telecommunications Research Institute, Daejon (KR)

(21) Appl. No.: 10/038,153

(22) Filed: Oct. 19, 2001

Related U.S. Patent Documents

Reissue of:
(64) Patent No.: 5,970,459
Issued: Oct. 19, 1999
Appl. No.: 08/970,224
Filed: Nov. 14, 1997

(30) Foreign Application Priority Data

Dec. 13, 1996 (KR) ..... 96-65445

(51) Int. Cl.
*G10L 21/06* (2006.01)
*G10L 13/08* (2006.01)

(52) U.S. Cl. ..... 704/276; 704/260
(58) Field of Classification Search ..... 704/260, 704/270, 275–278
See application file for complete search history.

(56) References Cited

U.S. PATENT DOCUMENTS

| | | | |
|---|---|---|---|
| 4,260,229 | A | 4/1981 | Bloomstein |
| 4,305,131 | A | 12/1981 | Best |
| 4,841,575 | A | 6/1989 | Welsh et al. |
| 5,111,409 | A | 5/1992 | Gasper et al. |

(Continued)

FOREIGN PATENT DOCUMENTS

| | | | |
|---|---|---|---|
| AT | 72 083 | B | 8/1992 |
| DE | 41 01 022 | A1 | 7/1992 |
| EP | 225 729 | | 6/1987 |
| EP | 689 362 | | 12/1995 |
| EP | 706 170 | | 4/1996 |
| JP | 02 234285 | | 9/1990 |
| JP | 2234285 | | 11/1990 |
| JP | 03 241399 | | 10/1991 |
| JP | 04 285769 | | 10/1992 |
| JP | 04 359299 | | 12/1992 |
| JP | 4359299 | | 12/1992 |
| JP | 05 064171 | | 3/1993 |
| JP | 05 188985 | | 7/1993 |
| JP | 05 313686 | | 11/1993 |
| JP | 5313686 | | 11/1993 |
| JP | 06 326967 | | 11/1994 |
| JP | 06 348811 | | 12/1994 |
| JP | 6348811 | | 12/1994 |
| JP | 07 038857 | | 2/1995 |
| WO | WO 85/04747 | | 10/1985 |

OTHER PUBLICATIONS

Nakumura et al. "Speech Recognition and Lip Movement Synthesis"; HMM based Audio–Visual Integration; pp. 93–98.

Yamamoto et al. pp. 245–246 Nara Institute of Science and Technology.

*Primary Examiner*—Angela A Armstrong
(74) *Attorney, Agent, or Firm*—Cohen Pontani Lieberman & Pavane LLP

(57) ABSTRACT

A method of formatting and normalizing continuous lip motions to events in a moving picture besides text in a Text-To-Speech converter is provided. A synthesized speech is synchronized with a moving picture by using the method wherein the real speech data and the shape of a lip in the moving picture are analyzed, and information on the estimated lip shape and text information are directly used in generating the synthesized speech.

5 Claims, 3 Drawing Sheets

U.S. PATENT DOCUMENTS 5,313,522 A 5/1994 Slager
5,386,581 A 1/1995 Suzuki et al.
5,500,919 A 3/1996 Luther ..... 704/260
5,557,661 A 9/1996 Yokoyama
5,608,839 A 3/1997 Chen
5,615,300 A 3/1997 Hara et al.
5,630,017 A 5/1997 Gasper et al. ..... 704/276
5,636,325 A 6/1997 Farrett
5,650,629 A 7/1997 Levi
5,657,426 A 8/1997 Waters et al. ..... 704/276
5,677,739 A 10/1997 Kirkland ..... 348/468
5,677,993 A 10/1997 Ohga et al.
5,689,618 A 11/1997 Gasper et al. ..... 704/276
5,729,694 A 3/1998 Holzrichter et al.
5,751,906 A 5/1998 Silverman
5,774,854 A 6/1998 Sharman
5,777,612 A 7/1998 Kataoka
5,860,064 A 1/1999 Henton

SYSTEM FOR SYNCHRONIZATION BETWEEN MOVING PICTURE AND A TEXT-TO-SPEECH CONVERTER

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a system for synchronization between moving picture and a text-to-speech(TTS) converter, and more particulary to a system for synchronization between moving picture and a text-to-speech converter which can be realized a synchronization between moving picture and synthesized speech by using the moving time of lip and duration of speech information.

2. Description of the Related Art

In general, a speech synthesizer provides a user with various types of information in an audible form. For this purpose, the speech synthesizer should provide a high quality speech synthesis service from the input texts given to a user. In addition, in order for the speech synthesizer to be operatively coupled to a database constructed in a multimedia environment, or various media provided by a counterpart involved in a conversation, the speech synthesizer can generate a synthesized speech so as to be synchronized with these media. In particular, the synchronization between moving picture and the TTS is essentially required to provide a user with a high quality service.

FIG. 1 shows a block diagram of a conventional text-to-speech converter which generally consists of three steps in generating a synthesized speech from the input text.

At step 1, a language processing unit 1 converts an input text to a phoneme string, estimates prosodic information, and symbolizes it. The symbol of the prosodic information is estimated from the phrase boundary, clause boundary, accent position, sentence patterns, etc. by analyzing a syntactic structure. At step 2, a prosody processing unit 2 calculates the values for prosody control parameters from the symbolized prosodic information by using rules and tables. The prosody control parameters include phoneme duration and pause interval information. Finally, a signal processing unit 3 generates a synthesized speech by using a synthesis unit DB 4 and the prosody control parameters. That is, the conventional synthesizer should estimate prosodic information related to naturalness and speaking rate only from an input text in the language processing unit 1 and the prosody processing unit 2.

Presently, a lot of researches on the TTS have been conducted through the world for application to mother languages, and some countries have already started a commercial service. However, the conventional synthesizer is aimed at its use in synthesizing a speech from an input text and thus there is no research activity on a synthesizing method which can be used in connection with multi-media. In addition, when dubbing is performed on moving picture or animation by using the conventional TTS method, information required to implement the synchronization of media with a synthesized speech cannot be estimated from the text only. Thus, it is not possible to generate a synthesized speech, which is smoothly and operatively coupled to moving pictures, from only text information.

If the synchronization between moving picture and a synthesized speech is assumed to be a kind of dubbing, there can be three implementation methods. One of these methods includes a method of synchronizing moving picture with a synthesized speech on a sentence basis. This method regulates the time duration of the synthesized speech by using information on the start point and end point of the sentence. This method has an advantage that it is easy to implement and the additional efforts can be minimized. However, the smooth synchronization cannot be achieved with this method. As an alternative, there is a method wherein information on the start and end point, and phoneme symbol for every phoneme are transcribed in the interval of the moving picture related to a speech signal to be used in generating a synthesized speech. Since the synchronization of moving picture with a synthesized speech can be achieved for each phoneme with this method, the accuracy can be enhanced. However, this method has a disadvantage that additional efforts should be exerted to detect and record time duration information for every phoneme in a speech interval of the moving picture.

As another alternative, there is a method wherein synchronization information is recorded based on patterns having the characteristic by which a lip motion can be easily distinguished, such as the start and end points of the speech, the opening and closing of the lip, protrusion of the lip, etc. This method can enhance the efficiency of synchronization while minimizing the additional efforts exerted to make information for synchronization.

SUMMARY OF THE INVENTION

It is therefore an object of the present invention to provide a method of formatting and normalizing continuous lip motions to events in a moving picture besides a text in a text-to-speech converter.

It is another object of the invention to provide a system for synchronization between moving picture and a synthesized speech by defining an interface between event information and the TTS and using it in generating the synthesized speech.

In accordance with one aspect of the present invention, a system for synchronization between moving picture and a text-to-speech converter is provided which comprises distributing means for multi-media input information, transforming it into the respective data structures, and distributing it to each medium; image output means for receiving image information of the multi-media information from said distributing means; language processing means for receiving language texts of the multi-media information from said distributing means, transforming the text into phoneme string, estimating and symbolizing prosodic information; prosody processing means for receiving the processing result from said language processing means, calculating the values of prosodic control parameters; synchronization adjusting means for receiving the processing results from said prosody processing means, adjusting time durations for every phoneme for synchronization with image signals by using synchronization information of the multi-media information from said distributing means, and inserting the adjusted time durations into the results of said prosody processing means; signal processing means for receiving the processing results from said synchronization adjusting means to generate a synthesized speech; and a synthesis unit database block for selecting required unit for synthesis in accordance with a request from said signal processing means, and transferring the required data.

BRIEF DESCRIPTION OF THE DRAWINGS

The present invention will become more apparent upon a detailed description of the preferred embodiments for carrying out the invention as rendered below. In the description to follow, references will be made to the accompanying drawings, where like reference numerals are used to identify like or similar elements in the various drawings and in which.

DETAILED DESCRIPTION OF THE INVENTION

Figure 1:
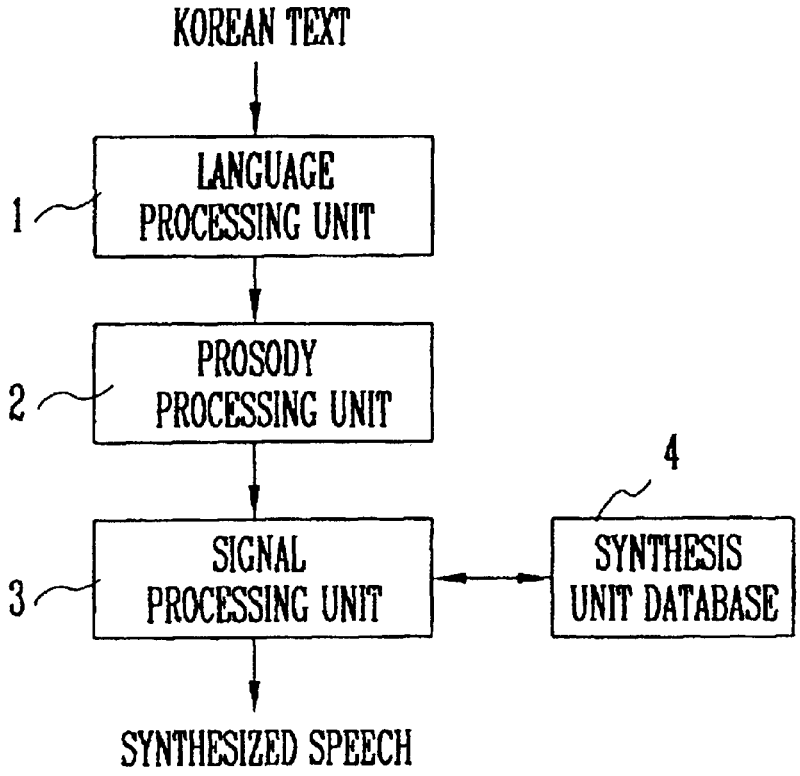
FIG. 1 (PRIOR ART)
FIG. 1 shows a block diagram of a conventional text-to-speech converter.
Figure 2:
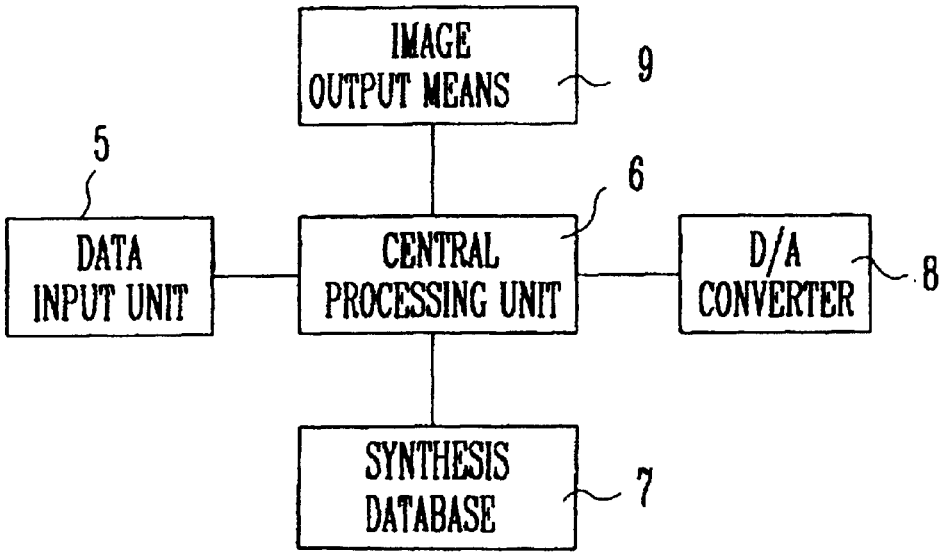
FIG. 2 shows a block diagram of a synchronization system in accordance with the present invention.

FIG. 2 shows a block diagram of a synchronization system in accordance with the present invention. In FIG. 2, reference numerals 5, 6, 7, 8 and 9 indicate a multi-data input unit, a central processing unit, a synthesized database, a digital/analog(D/A) converter, and an image output unit, respectively.

Data comprising multi-media such as an image, text, etc. is inputted to the multi-data input unit 5 which outputs the input data to the central processing unit 6. Into the central processing unit 6, the algorithm in accordance with the present invention is embedded. The synthesized database 7, a synthesized DB for use in the synthesis algorithm is stored in a storage device and transmits necessary data to the central processing unit 6. The digital/analog converter 8 converts the synthesized digital data into an analog signal to output it to the exterior. The image output unit 9 displays the input image information on the screen.

Table 1 as shown below illustrates one example of structured multi-media input information to be used in connection with the present invention. The structured information includes a text, moving picture, lip shape, information on positions in the moving picture, and information on the time duration. The lip shape can be transformed into numerical values based on a degree of a down motion of a lower lip, up and down motion at the left edge of an upper lip, up and down motion at the right edge of an upper lip, up and down motion at the left edge of a lower lip, up and down motion at the right edge of a lower lip, up and down motion at the center portion of an upper lip, up and down motion at the center portion of a lower lip, degree of protrusion of an upper lip, degree of protrusion of a lower lip, distance from the center of a lip to the right edge of a lip, and distance from the center of a lip to the left edge of a lip. The lip shape can also be defined in a quantified and normalized pattern in accordance with the position and manner of articulation for each phoneme. The information on positions is defined by the position of a scene in a moving picture, and the time duration is defined by the number of the scenes in which the same lip shape is maintained.

TABLE 1

Example of Synchronization Information

| Input Information | Parameter | Parameter Value |
|---|---|---|
| text | sentence | |
| moving picture | scene | |
| synchronization information | lip shape | degree of a down motion of a lower lip, up and down motion at the left edge of an upper lip, up and down motion at the right edge of an upper lip, up and down motion at the left edge of a lower lip, up and down motion at the right edge of a lower lip, up and down motion at the center portion of an upper lip, up and down motion at the center portion of a lower lip, degree of protrusing of an upper lip, degree of protrusion of a lower lip, distance from the center of a lip to the right edge of a lip, and distance from the center of a lip to the left edge of a lip |
| | information on position | position of scene in moving picture |
| | time duration | number of continuous scenes |

Figure 3:
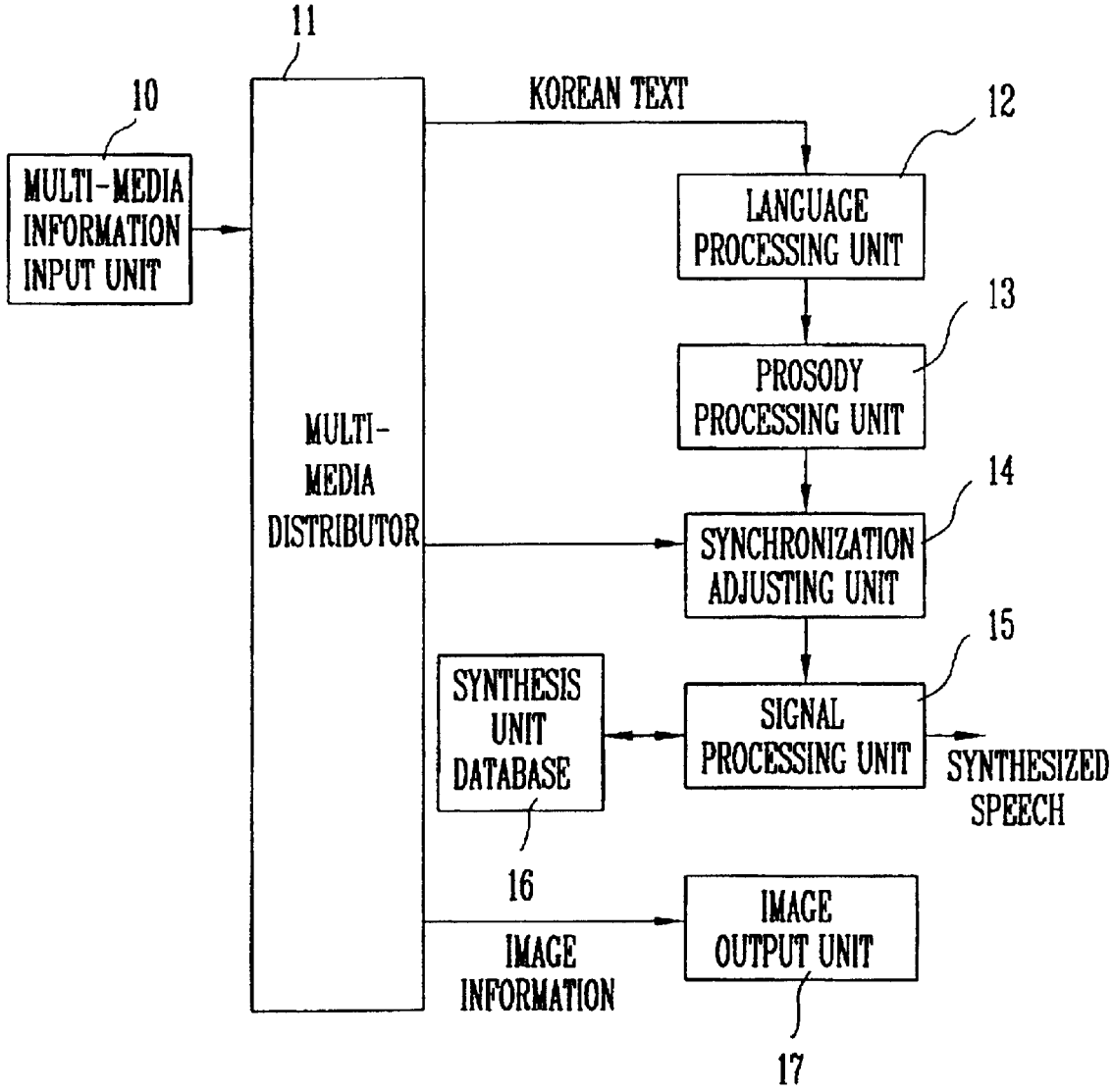
FIG. 3 shows a detailed block diagram to illustrate a method of synchronizing a text-to-speech converter.
Figure 4:
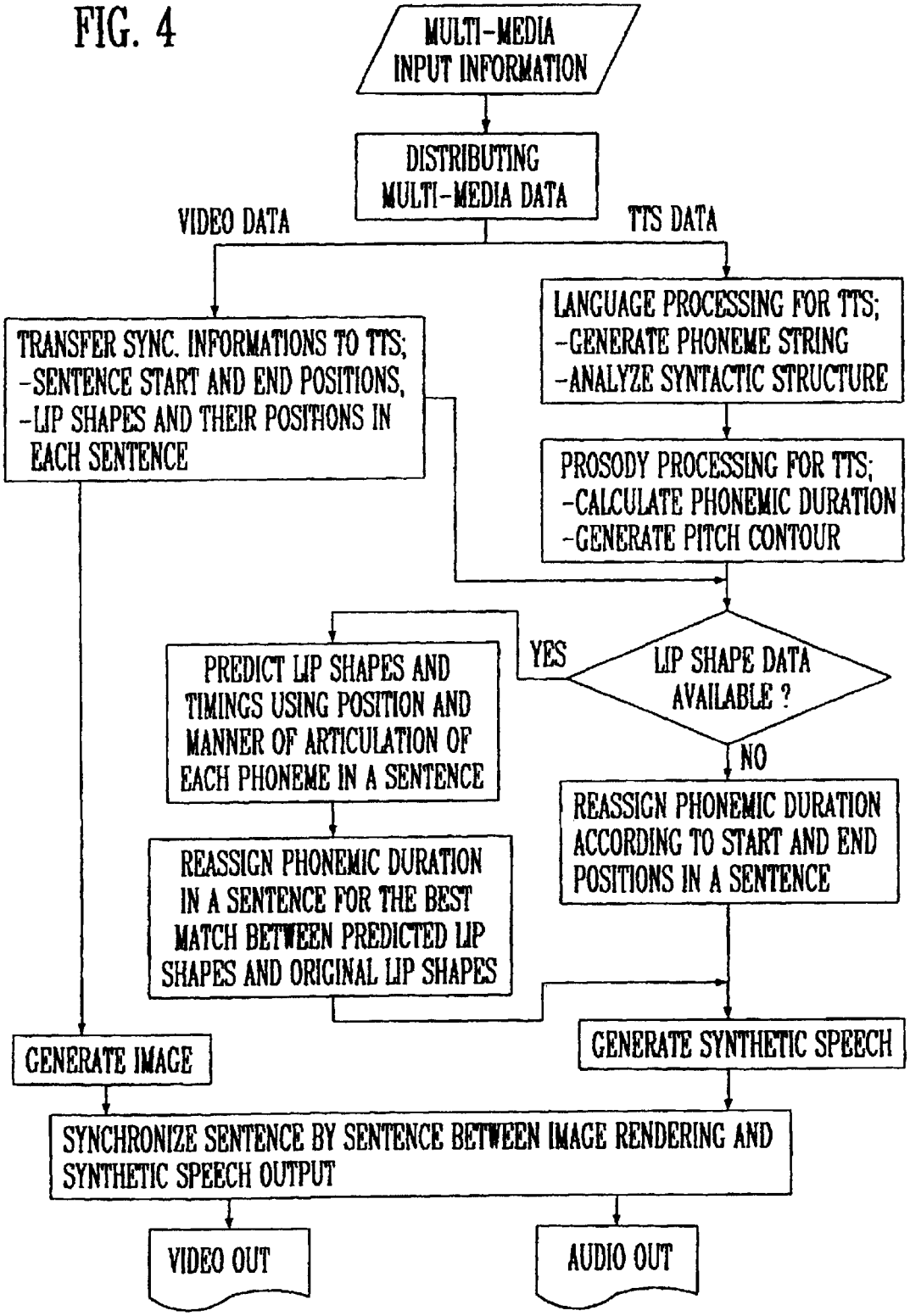
FIG. 4 shows a flow chart to illustrate a method of synchronizing a text-to-speech converter.

FIG. 3 shows a detailed block diagram to illustrate a method of synchronizing a text-to-speech converter and FIG. 4 shows a flow chart to illustrate a method of synchronizing a text-to-speech converter. In FIG. 3, reference numerals 10, 11, 12, 13, 14, 15, 16 and 17 indicate a multi-media information input unit, a multi-media distributor, a standardized language processing unit, a prosody processing unit, a synchronization adjusting unit, a signal processing unit, a synthesis unit database, and an image output unit, respectively.

The multi-media information in the multi-media information input unit 10 is structured in a format as shown above in table 1, and comprises a text, moving picture, lip shape, information on positions in the moving picture, and information on time durations. The multi-media distributor 11 receives the multi-media information from the multi-media information input unit 10, and transfers images and texts of the multi-media information to the image output unit 17 and the language processing unit 12, respectively. When the synchronization information is transferred, it is converted into a data structure which can be used in the synchronization adjusting unit 14.

The language processing unit 12 converts the texts received from the multi-media distributor 11 into a phoneme string, and estimates and symbolize prosodic information to transfer it to the prosody processing unit 13. The symbols for the prosodic information are estimated from the phrase boundary, clause boundary, the accent position, and sentence pattern, etc. by using the results of analysis of syntax structures.

The prosody processing unit 13 receives the processing results from the language processing unit 12, and calculates the values of the prosodic control parameters. The prosodic control parameter includes the time duration of phonemes, contour of pitch, contour of energy, position of pause, and length. The calculated results are transferred to the synchronization adjusting unit 15.

The synchronization adjusting unit 14 receives the processing results from the prosody processing unit 13, and adjusts the time durations for every phoneme to synchronize the image signal by using the synchronization information which was received from the multi-media distributor 11. With the adjustment of the time duration of phonemes, the lip shape can be allocated to each phoneme in accordance with the position and manner of articulation for each phoneme, and the series of phonemes is divided into small groups corresponding to the number of the lip shapes recorded in the synchronization information by comparing the lip shape allocated to each phoneme with the lip shape in the synchronization information.

The time durations of the phonemes in each small group are calculated again by using information on the time durations of the lip shapes which is included in the synchronization information. The adjusted time duration information is made to be included in the results of the prosody processing unit 13, and is transferred to the signal processing unit 15.

The signal processing unit 15 receives the processing results from the synchronization adjusting unit 14, and generates a synthesized speech by using the synthesis unit DB 16 to output it. The synthesis unit DB 16 selects the synthesis units required for synthesis in accordance with the request from the signal processing unit 15, and transfers required data to the signal processing unit 15.

In accordance with the present invention, a synthesized speech can be synchronized with moving picture by using the method wherein the real speech data and the shape of a lip in the moving picture are analyzed, and information on the estimated lip shape and text information are directly used in generating the synthesized speech. Accordingly, the dubbing of target language can be performed onto movies in foreign languages. Further, the present invention can be used in various applications such as a communication service, office automation, education, etc. since the synchronization of image information with the TTS is made possible in the multi-media environment.

The present invention has been described with reference to a particular embodiment in connection with a particular application. Those having ordinary skill in the art and access to the teachings of the present invention will recognize additional modifications and applications within the scope thereof.

It is therefore intended by the appended claims to cover any and all such applications, modifications, and embodiments within the scope of the present invention.

What is claimed is:

1. A system for synchronization between a moving picture and a text-to-speech converter, comprising:

distributing means for receiving multi-media input information, transforming said multi-media input information into respective data structures, and distributing the respective data structures for further processing;

image output means for receiving image information of the distributed multi-media information and displaying the image information;

language processing means for receiving language texts of the distributed multi-media information, transforming the language texts into phoneme strings, and estimating and symbolizing prosodic information from the language texts;

prosody processing means for receiving the prosodic information from said language processing means, and calculating values of prosodic control parameters;

synchronization adjusting means for receiving the prosodic control parameters from said prosody processing means, adjusting time durations for every phoneme for synchronization with the image information by using synchronization information of the distributed multi-media information, and inserting adjusted time durations into the prosodic control parameters;

signal processing means for receiving the processing results from said synchronization adjusting means and generating a synthesized speech; and a synthesis unit database block for selecting required units for synthesis in accordance with a request from said signal processing means, and transmitting the required data to said signal processing means.

2. The system according to claim 1, wherein the multi-media information comprises:

the language texts, image information on moving picture, and synchronization information, and wherein the synchronization information includes:

[a text,] information on a lip shape, information on image positions in the moving picture, and information on time durations.

3. The system according to claim 2, wherein the information on the lip shape can be transformed into numerical values based on a degree of a down motion of a lower lip, up and down motion at a left edge of an upper lip, up and down motion at a right edge of the upper lip, up and down motion at a left edge of the lower lip, up and down motion at a right edge of the lower lip, up and down motion at a center portion of the upper lip, up and down motion at a center portion of the lower lip, a degree of protrusion of the upper lip, a degree of protrusion of the lower lip, a distance from the center of the lip to the right edge of the lip, and a distance from the center of the lip to the left edge of the lip, and wherein the information on the lip shape is definable in a quantified and normalized pattern in accordance with the position and manner of articulation for each phoneme.

4. The system according to claim 1, wherein said synchronization adjusting means comprises means for calculating time durations of phonemes within a text by using the synchronization information in accordance with a predicted lip shape determined by a position and manner of articulation for each phoneme within a text a lip shape within the synchronization information, and time durations.

*5. The system of claim 2, wherein said synchronization information further includes text.*

* * * * *